(12) United States Patent
Penkler et al.

(10) Patent No.: US 6,891,863 B1
(45) Date of Patent: May 10, 2005

(54) DEVICE AND METHODS FOR PROCESSING CHANNELS IN A DATA STREAM

(75) Inventors: David Penkler, Claix (FR); Daniel Tronca, Saint Martin d'Hères (FR); Francois Vincent, Corenc (FR)

(73) Assignee: Hewlett-Packard Development Company, Houston, TX (US)

( * ) Notice: Subject to any disclaimer, the term of this patent is extended or adjusted under 35 U.S.C. 154(b) by 674 days.

(21) Appl. No.: 09/684,845

(22) Filed: Oct. 6, 2000

(30) Foreign Application Priority Data

Oct. 8, 1999 (EP) .......................................... 99410129

(51) Int. Cl.[7] ................................................ H04J 3/02
(52) U.S. Cl. ...................................... 370/539; 370/541
(58) Field of Search .............................. 370/395.6, 397, 370/395.51, 395.3, 395.2, 399, 535–545, 464, 466; 711/100, 200

(56) References Cited

U.S. PATENT DOCUMENTS

| | | | |
|---|---|---|---|
| 4,323,790 A | 4/1982 | Dunning et al. | |
| 4,942,553 A | 7/1990 | Dalrymple et al. | |
| 5,448,558 A | 9/1995 | Gildea et al. | |
| 5,528,530 A | 6/1996 | Powell et al. | |
| 5,568,486 A | 10/1996 | Huscroft et al. | |
| 5,623,493 A | 4/1997 | Kagemoto | |
| 5,649,161 A | 7/1997 | Andrade et al. | |
| 5,673,399 A | 9/1997 | Guthrie et al. | |
| 5,742,600 A | 4/1998 | Nishihara | |
| 5,742,765 A | 4/1998 | Wong et al. | |
| 5,881,248 A | 3/1999 | Mergard | |
| 5,940,456 A | * 8/1999 | Chen et al. | 375/356 |
| 6,049,550 A | * 4/2000 | Baydar et al. | 370/466 |
| 6,603,776 B1 | * 8/2003 | Fedders et al. | 370/476 |

OTHER PUBLICATIONS

Abstract of :Toshiro, Shikama; "Time–Division Multiplexing Device"; JP–01094731; *Patent Abstracts of Japan*; Apr. 13, 1989.

* cited by examiner

*Primary Examiner*—Ajit Patel (57) ABSTRACT

A device for individually processing a plurality of data transmission channels, wherein data for each channel is contained at a predetermined position in a serially received frame, includes means for determining the position in the frame of currently received data of the frame; a channel memory providing a channel number in response to the position of the currently received data; and a plurality of FIFOs respectively associated to the channels, wherein each FIFO is responsive to a respective channel number provided by the channel memory for storing the currently received data.

25 Claims, 5 Drawing Sheets

DEVICE AND METHODS FOR PROCESSING CHANNELS IN A DATA STREAM

FIELD OF THE INVENTION

The present invention relates to telecommunications and in particular to the processing of multiplexed data streams, such as Synchronous Optical NETwork (SONET) frames, Synchronous Digital Hierarchy (SDH) frames, or similar.

BACKGROUND OF THE INVENTION

SONET and SDH are equivalent standards (respectively American and European) for transporting data on optical networks. According to these standards, data corresponding to multiple communication channels are conveyed in hierarchical frames.

Figure 1:
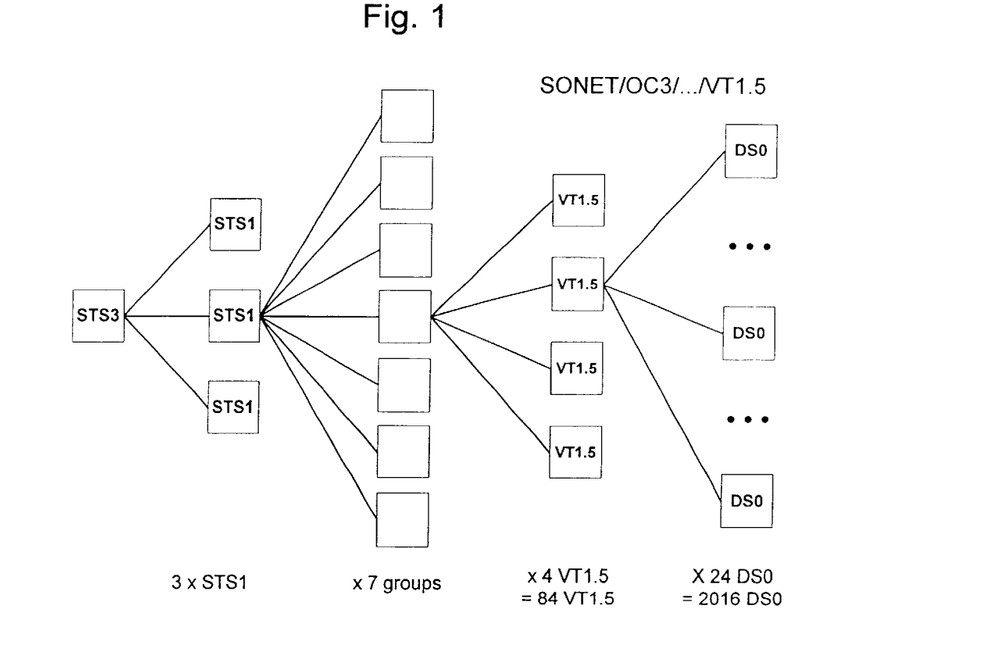
FIG. 1 shows an exemplary SONET/OC3 frame hierarchy.

FIG. 1 shows an exemplary hierarchy according to the SONET standard. This hierarchy corresponds to the Optical Carrier level 3 (OC3) signal which has a 155.52 Mbits/s bit rate. The top-level frame STS3 (Synchronous Transport Signal level 3) is transmitted in 125 µs. It contains three STS1 frames. Each STS1 frame contains seven groups of Virtual Tributaries (VT). A group may include four VT1.5 containers (size 1.5 VTs). Each VT1.5 container includes 24 bytes corresponding to concurrent DS0 signals. A DS0 (Digital Signal level 0) has a data transmission rate of 64 kb/s.

The OC3 signal thus conveys 2016 concurrent DS0 signals and has an effective bit rate of 129.024 Mbits/s. The remainder of the 155.52 Mbit/s capacity is used for transporting necessary overhead.

Other hierarchies exist. In particular, the VT groups of an STS1 frame may contain, each, three VT2 frames, two VT3 frames or one VT6 frame.

Figure 2:
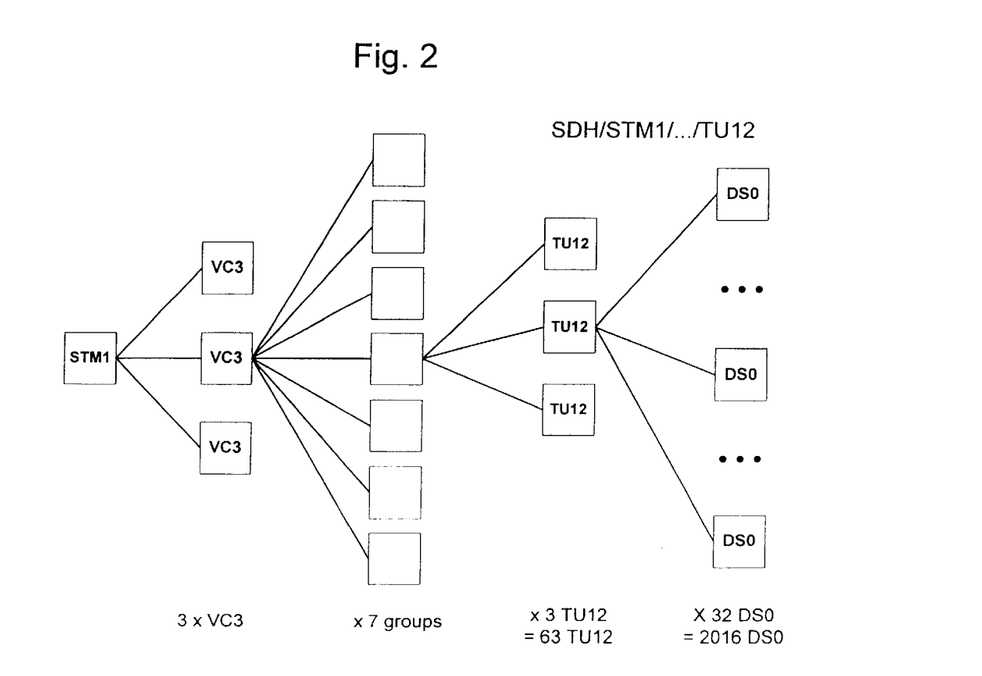
FIG. 2 shows an exemplary SDH/STM1 frame hierarchy.

FIG. 2 shows the SDH equivalent of the hierarchy of FIG. 1. The top level frame is STM1 (Synchronous Transport Module level 1). It contains three VC3 (Virtual Container level 3) frames. Each VC3 frame contains seven groups of three TU12 (Tributary Unit level 12) frames. Finally each TU12 frame contains 32 DS0 bytes. This also amounts to 2016 DS0 signals.

For conciseness, the following description will only refer to the SONET standard as an example, but the teachings provided herein readily apply to the SDH standard.

Figure 3:
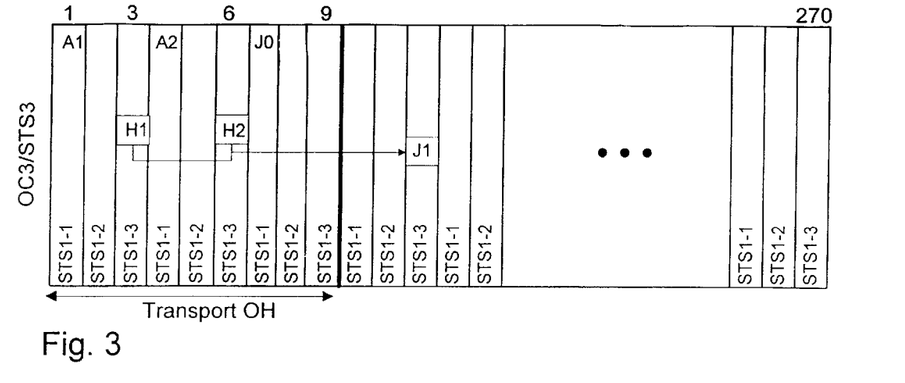
FIG. 3 shows the structure of an STS3 frame.

FIG. 3 shows the structure of an STS3 frame. It is arranged in a byte matrix of 270 columns and 9 rows. The bytes of the matrix are transmitted from left to right and from top to bottom. Each of the three conveyed STS1 frames has three columns of transport overhead. These overhead columns are interlaced in the nine first columns of the matrix. As an example, the first three transport overhead bytes, designated by A1, A2 and J0, are marked for the first STS1 frame (i.e. the bytes in the first row of the $1^{st}$, $4^{th}$ and $7^{th}$ columns).

The overhead bytes are fully documented in the standard. Only some of them will be mentioned herein for the comprehension of the invention.

The three STS1 frames, designated STS1-1, STS1-2 and STS1-3, are contained in respective remaining columns of the matrix, in interlaced manner, i.e., from the $10^{th}$ to the $270^{th}$ column, three consecutive columns belong respectively to the three STS1 frames.

The STS1 frames are conveyed in a floating manner: they start at arbitrary positions in the STS3 frame. Two bytes, designated by H1 and H2, of the transport overhead of each STS1 frame form a pointer indicating the position of the first byte of the STS1 frame. The first byte of an STS1 frame is a "path overhead" byte designated by J1.

One purpose of this floating frame and pointer technique is to allow STS1 frames to be inserted at any point in time into a current transmission. Another purpose is to compensate transmission speed drifts, especially drifts in clock rates between the transmitter and receiver ends. If the transmitter clock is slower than the receiver clock, a meaningless byte is inserted every now and then between consecutive STS1 frames, whereby the pointer to the second frame is incremented by 1. This is designated as positive stuffing in the standard.

If the transmitter clock is faster than the receiver clock, an STS1 frame is shifted back by one byte every now and then, whereby the pointer to the frame is decreased by 1. In fact, the STS1 frame will not overlap the previous frame, because a specific transport overhead byte (designated by H3) is provided to receive the first byte of the shifted back frame. This is designated as "negative stuffing" in the standard.

Figure 4:
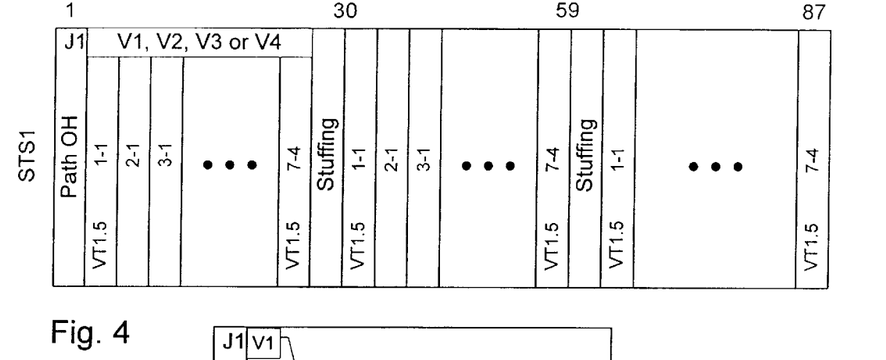
FIG. 4 shows the structure of an STS1 frame.

FIG. 4 shows the structure of an STS1 frame. It is arranged according to a byte matrix of 87 columns and 9 rows. The first column contains the "path overhead", the first byte of which is designated by J1. Columns 30 and 59 contain fixed stuffing bytes. The remaining columns contain the 7 groups of 4 VT1.5 containers, interleaved by groups. These columns are designated in FIG. 4 by references of the type i-j, where i is the group number and j the frame number in the group.

The first row, between positions 2 and 29, contains overhead bytes, designated by V1, V2, V3 and V4, which are intended to identify the starting points of the VT1.5 containers, since such frames are also conveyed in a floating manner.

Figure 5:
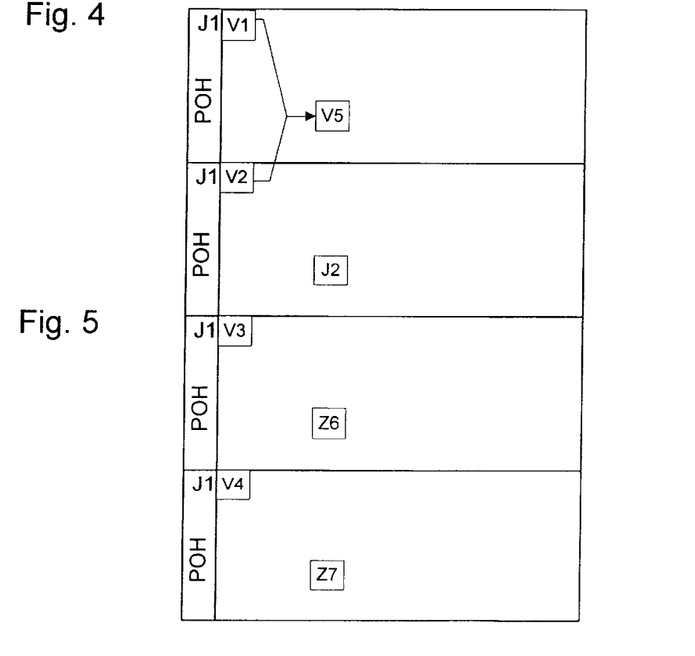
FIG. 5 shows a super-frame of four consecutive STS1 frames.

FIG. 5 illustrates how consecutive VT1.5 containers are transmitted and identified. In fact, four consecutive VT1.5 containers are conveyed in a super-frame comprised of four consecutive STS1 frames. Bytes V1 to V4 are transmitted respectively in the $1^{st}$ to $4^{th}$ STS1 frames of the super-frame. Bytes V1 and V2 form a "VT payload pointer" and identify the position of the first byte of the first of the four respective VT1.5 containers. This first byte is designated by V5. The first bytes of the three other VT1.5 containers are respectively designated by J2, Z6 and Z7. Bytes V5, J2, Z6 and Z7 constitute a "VT path overhead".

Such a hierarchy is for example used for handling telephone links corresponding to DS0 signals in a telephone exchange. For this purpose, one uses add/drop multiplexers. Such a device extracts (drops) a specific DS0 data flow from an OC3 link and/or inserts (adds) a DS0 data flow into the OC3 link. The remaining traffic passes straight through the multiplexer without additional preprocessing.

Figure 6:
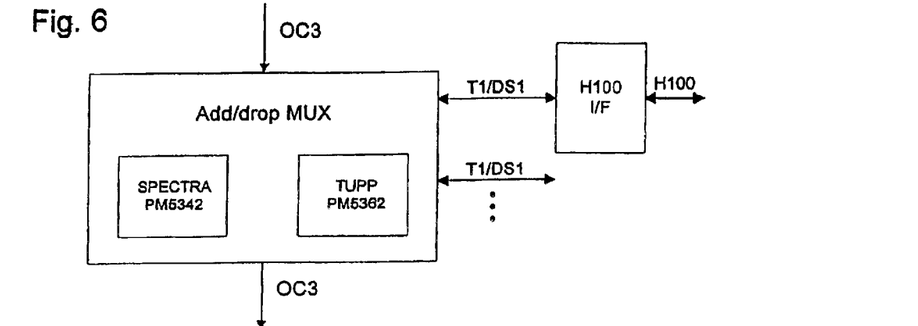
FIG. 6 schematically shows a conventional add/drop multiplexer.

FIG. 6 schematically shows a conventional add/drop multiplexer (ADM) 10. The ADM may be built around two integrated circuits made by PMC-Sierra, i.e. the PM5342 path/section transceiver, aka SPECTRA, and the PM5362 tributary unit payload processor (TUPP). The association of these circuits identifies the positions of the payloads of the VT1.5 containers in an OC3 link and thus allows these containers or their DS0 signals to be extracted individually in a simple manner. The insertion of VT1.5 containers in the OC3 link is straightforward, since the necessary position information has already been calculated for the extraction.

The individual DS0 signals (extracted or to insert) are exchanged over a standard telecommunications bus, such as SC, MUIP or H.100, to carry out any necessary operations, such as switching or routing. The DS0 signals of each VT1.5 container are exchanged with the telecommunications bus over an individual T1 link and bus interface 12.

Such add/drop multiplexers are usually limited to the processing of a few VT1.5 containers. Indeed, a single VT1.5 container conveys 24 DS0 signals which are statistically sufficient for satisfying 360 telephone subscribers. Therefore, just a few VT1.5 containers (up to eight) are necessary in most telephone exchanges. The processing of all the VT1.5 containers would require 84 bus interfaces 12, usually in the form of individual add-on cards, which would considerably increase the complexity and bulk of the device.

However, there is a growing need for the handling of large numbers of telephone communications from centralized locations. Such a need is found especially in large scale voice-mail systems.

SUMMARY OF THE INVENTION

The present invention is directed to providing a low complexity and small bulk device, preferably in the form of a single card, which is capable of individually handling all the DS0 signals of a high speed transmission signal, such as OC3.

One difficulty is to assign all 2016 DS0 signals contained in an OC3 signal to individual channels.

This difficulty is overcome in general by a device for individually processing a plurality of data transmission channels, wherein data for each channel is contained at a predetermined position in a serially received frame, including means for determining the position in the frame of currently received data of the frame; a channel memory providing a channel number in response to the position of the currently received data; and a plurality of FIFOs respectively associated to the channels, wherein each FIFO is responsive to a respective channel number provided by the channel memory for storing the currently received data.

BRIEF DESCRIPTION OF THE DRAWINGS

The foregoing and other objects, features, aspects and advantages of the invention will become apparent from the following detailed description of embodiments of the present invention when taken in conjunction with the accompanying drawings.

BEST MODE OF CARRYING OUT THE INVENTION

Figure 7:
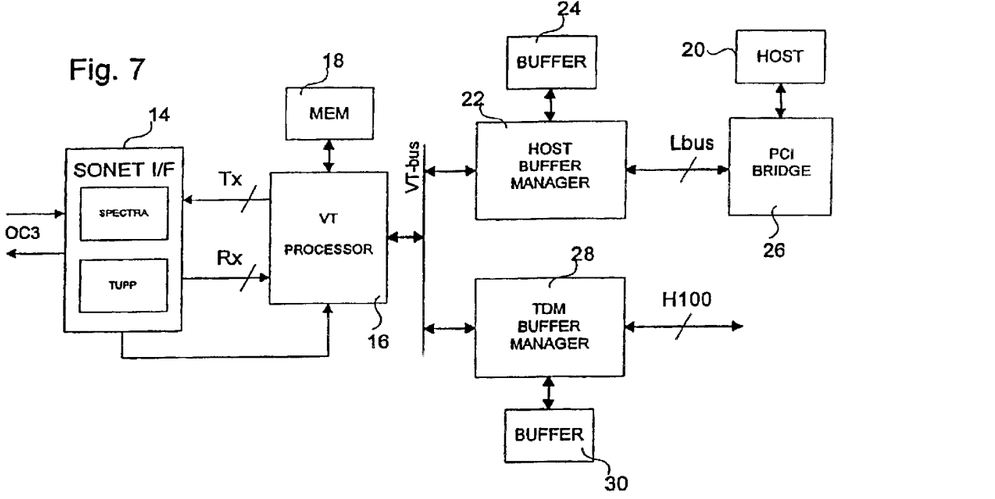
FIG. 7 shows a simplified architecture of a device according to the invention for processing all the DS0 signals conveyed on a high-speed link.

In FIG. 7, a SONET interface 14 serves to convert an incoming OC3 signal at 155.52 Mbits/s to a receive byte stream Rx at 19.44 Mbytes/s and to convert a same speed transmit byte stream Tx to an outgoing OC3 signal. For this purpose, the interface 14 uses part of the functionality of a conventional add/drop multiplexer of the type of FIG. 6. In particular, it may use the SPECTRA and TUPP circuits used in such a multiplexer.

With such circuits, the byte streams Rx and Tx are in STS3 frame format, i.e. they correspond to the left to right and top to bottom scanning of the matrix shown in FIG. 3.

The receive stream Rx is the one that requires most intensive processing by the interface 14. The TUPP circuit is in charge of identifying the STS1 frames and the VT1.5 containers which, as previously mentioned, start at arbitrary positions in their respective higher level frames STS3 and STS1. For this purpose, it carries out the necessary pointer management and produces various synchronization signals illustrated in FIG. 8. An STS1-sync signal produces a clock pulse for every first byte (J1) of an STS1 frame, and a VT1.5-sync signal produces a clock pulse for every V5 byte, i.e. every first byte of a group of four consecutive VT1.5 containers of a super-frame.

Figure 8:
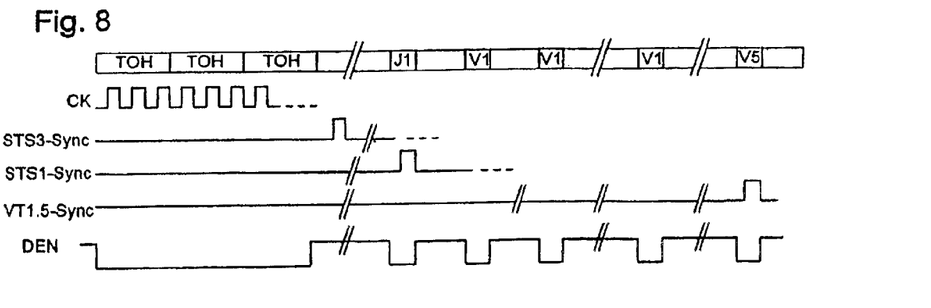
FIG. 8 is a time diagram illustrating various signals provided by a SONET interface used in the device of FIG. 7.

An STS3-sync signal is generated by the SPECTRA circuit. It produces a clock pulse for every first byte of the STS3 payload, i.e. in the first row, $10^{th}$ column of the STS3 frame.

The transmit byte stream Tx is provided directly to the SPECTRA circuit which is in charge of inserting it as it comes in the outgoing OC3 signal. This means that all the overhead bytes have previously been computed and placed in the Tx stream. This is however not complex, since the device of FIG. 7 entirely extracts all the data from the incoming OC3 signal and therefore does not need to manage floating positions of frames in the outgoing OC3 signal, i.e. the frames will all be aligned and the frame pointers set to zero.

Anyway, such functionality of the interface 14 is similar to that of conventional add/drop multiplexers. The purpose of the invention is to individually handle all 2016 DS0 signals of one OC3 signal.

The difficulty is thus to demultiplex the incoming DS0 signals from the input stream Rx and, conversely, multiplex the outgoing DS0 signals into the outgoing stream Tx. This functionality is ensured by a "Virtual Tributary processor" 16 shown in FIG. 7. This processor operates in association with a memory 18 and a specific bus designated by VT-bus. The VT-bus is coupled to a user circuit which will exploit the individual DS0 signals. FIG. 7 illustrates two exemplary users.

A first user is a host computer 20 connected to the device through a PCI bus. The VT-bus is coupled to the PCI bus successively through a host buffer manager 22 operating in conjunction with a buffer 24, and a PCI bridge 26.

The host computer is used, for example, to store in the form of files voice messages which are being received and transmitted through respective DS0 signals corresponding to telephone links.

A second user is a telecommunications bus, such as H.100. This bus is coupled to the VT-bus through a TDM buffer manager 28 operating in conjunction with a buffer 30. The H.100 bus, capable of transporting 2048 DS0 signals in Time Division Multiplex (TDM), is used, for example, to carry out on the fly signal processing, such as compression or encryption, on incoming DS0 signals. The processed signals become respective outgoing DS0 signals. It may also be used for switching and routing purposes like in an add/drop multiplexer.

Figure 9:
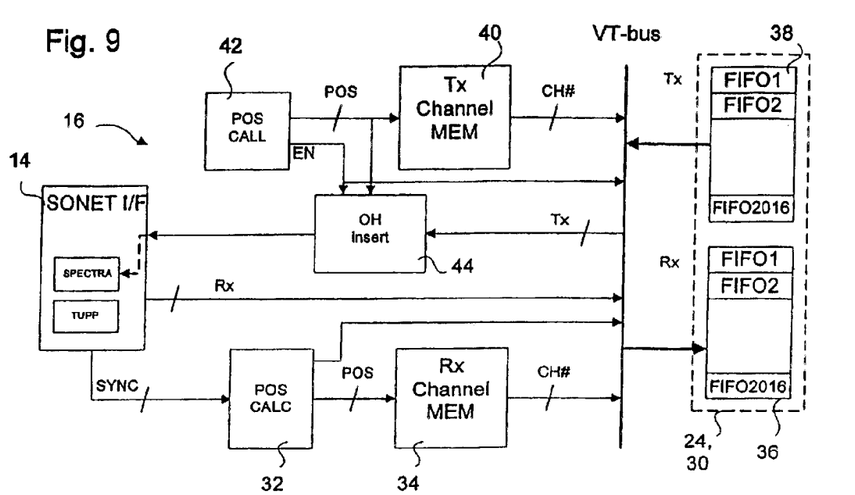
FIG. 9 schematically shows a VT-processor used in the device of FIG. 7.

FIG. 9 shows in more detail an architecture of the VT processor of FIG. 7. For the processing of the receive byte stream Rx, the various synchronization signals SYNC (STS3-sync, STS1-sync, VT1.5-sync) provided by the SONET interface 14 are provided to a position calculation unit 32. The role of this unit is to provide the position in a current STS3 frame of a payload (or DS0) byte currently conveyed in the Rx stream. The calculation is achieved so that the positions of the bytes of consecutive VT1.5 containers remain the same, even if the corresponding STS1 frames shift for compensating clock drifts (positive or negative stuffing).

The positions are assigned, for example, hierarchically to the DS0 bytes of a single VT1.5 container, to the VT1.5 containers of a same VT group, to the VT groups of a same STS1 frame, and finally to the STS1 frames. With this rule, assuming for sake of simplicity that all the VT1.5 containers are aligned in the STS3 frame, the positions of the first DS0 bytes received on the Rx stream are 1, 672+1, 1344+1, 97, 672+97, 1344+97, 193, ,672+193, 1344+193, 289, 672+289, 1344+289, etc. These irregular position values are due to the fact that the three STS1 frames are interlaced in the STS3 frame (see FIG. 3), and that the VT1.5 containers are interlaced by groups in each STS1 frame (see FIG. 4).

Those skilled in the art will readily construct such a position calculation unit, exploiting the various synchronization signals conventionally provided by the SPECTRA and TUPP circuits and the knowledge of the frame structures.

The position information is provided by unit 32 as a read address to a receive channel memory 34. This memory contains a user defined channel number in each location, i.e. for each position. The channel number provided by memory 34 in response to the position information is placed on the VT-bus as a write address, the data to be written being the current byte on stream Rx. When the position information provided to memory 34 is not significant, i.e. when the bytes on stream Rx are overhead bytes, the write operations are inhibited, for example by an inactive state of a data enable signal DEN.

The data enable signal DEN is generated by the position calculation unit 32 from the SYNC signals and the knowledge of the frame structures, namely of the locations of the overhead bytes. Thus, signal DEN is asserted only during the effective payload bytes, as illustrated in FIG. 8.

The device in which data is written is a receive buffer 36 coupled to the VT-bus. Buffer 36 is comprised of as many FIFOs as DS0 signals to process (2016), and each FIFO reacts to a respective channel number presented as a write address on the VT-bus by storing the current DS0 byte. The FIFOs are individually accessible by a user circuit, whereby each channel, thus each DS0 signal, may be processed individually.

In practice, the FIFOs are implemented as respective memory areas in a single dual-port memory. The read and write addresses of the dual-port memory are managed by a state machine which maintains pointers indicating, for each FIFO, the locations in which to read and write.

Outgoing DS0 bytes are written in a transmit buffer 38 by the user circuit, in individual FIFOs respectively associated to 2016 output channels. Buffers 36 and 38 form together a buffer (24 or 30 in FIG. 7) associated to a user circuit. Each FIFO of buffer 38 reacts to a respective channel number presented as a read address on the VT-bus by placing a next byte in the transmit stream Tx. The channel number is provided by a transmit channel memory 40 which, like channel memory 34, contains a user definable channel number for each position of a DS0 byte in an outgoing STS3 frame.

The positions of the outgoing DS0 bytes are generated by a position counter 42 in a similar manner the positions are calculated for the incoming stream Rx. However, this position generation is much simpler, because all the frames will be aligned with each other and the frame pointers will be zero. An enable signal EN, equivalent to signal DEN, is also generated to differentiate the payload byte positions from the overhead byte positions. This signal EN is provided on the VT-bus to avoid data to be read from buffer 38 when the position provided by counter 42 corresponds to an overhead byte.

The necessary overhead bytes are calculated and inserted in the outgoing stream Tx by a unit 44, exploiting the position and enable signals from counter 42.

Each of the streams Rx and Tx has a transmission rate of 19.44 Mbytes/s. This means the VT-bus is clocked at 38.88 Mbytes/s to process the Rx stream every first clock cycle and the Tx stream every second cycle The position calculation task for the incoming stream Rx may be simplified if the TUPP is given a specific command which causes it to realign the three STS1 frames in the corresponding STS3 frame. In other words, the path overhead columns of the three STS1 frames will be the $10^{th}$ to $12^{th}$ columns of the STS3 frame, immediately following the transport overhead columns, and bytes V1–V4 will be in the first row, from positions 13 to 96.

The operation of the host buffer manager 22 (FIG. 7) will now be described. The host buffer manager 22 is in charge of transferring the DS0 bytes stored in the FIFOs of receive buffer 36 (FIG. 9) to the host system through the PCI bus, and of transferring DS0 bytes read on the host system through the PCI bus into the FIFOs of transmit buffer 38. Due to the operation of the VT processor, each FIFO contains DS0 bytes corresponding to a single respective channel, whereby the processing of this data is particularly simple and straightforward. For example, the content of each FIFO corresponds, to a respective file stored on the host system.

The receive buffer 36 is filled by the VT processor at an effective rate of 16 Mbytes/s whereas the transmit buffer 38 is emptied by this processor at an effective rate of 16 Mbytes/s (the effective traffic of DS0 bytes is 32 Mbytes/s instead of 38.88 Mbytes/s due to the removal of the overhead). Therefore, the host buffer manager must ensure that this traffic is sustained through the PCI bus and that the FIFOs never over or underflow.

The 32 Mbytes/s traffic is a quarter of the theoretical PCI bus throughput. The theoretical throughput of a PCI bus is hardly ever sustainable, especially when data stored on a hard disk or other mass storage media is retrieved via the PCI bus. Indeed, mass storage media have a throughput far below that of the PCI bus, whereby the data is maintained partially in a cache memory or a Translate Look-aside Buffer (TLB) having the necessary throughput. Nevertheless, there are always read access latencies, even in the cache memory or TLB, which latencies may reach 1 µs in case of a cache miss.

Moreover, a conventional PCI bridge achieves transfers in response to specific commands which require several cycles to complete, daring which no effective data is transferred.

All these considerations make it very difficult to reach even a quarter of the PCI's theoretical throughput, even if the PCI bus is dedicated to the task.

Figure 10:
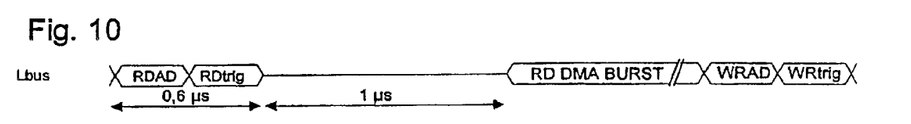
FIG. 10 is a time diagram of a DMA read cycle through a PCI bus.

The most effective manner to reduce the impact of read latency and instruction cycles is to achieve DMA transfers over the PCI bus. Indeed, this allows data to be transferred by large bursts in which the latency and instruction cycles are only involved once for each burst FIG. 10 illustrates a typical DMA read cycle over a PCI bus, initiated on the local bus Lbus between the PCI bridge 26 and the host buffer manager 22. A first instruction RDAD is provided to the PCI bridge, indicating a read operation, the address to read, and the size of the burst. Immediately after that, a second instruction RDtrig is provided to the PCI bridge for triggering the read operation. Such instructions may take up to 12 clock cycles each for a conventional PCI bridge such as the PLX PCI9080 circuit, i.e. 0.3 µs each in the present case where the local bus is clocked at 38.88 MHz. In the worst case, as shown, the read burst may arrive on the PCI bus and then on the local bus 1 µs after the end of the RDtrig instruction.

Another DMA read or write cycle may start after the DMA read burst. FIG. 10 shows this for a write cycle, initiated by a WRAD instruction and a WRtrig instruction.

In a DMA write cycle, the burst can be written immediately after the write trigger instruction WRtrig.

With such DMA cycles, it is useful to increase the size of the bursts to reduce the significance of the instruction and latency cycles. However, in the present case, it is not possible to increase the write bursts above a certain limit. Indeed, the data written in a DMA burst corresponds to a single channel, i.e. the content of a single FIFO of the receive buffer 36, which means that this FIFO must contain all the bytes for the burst. But the FIFO receives only one byte every STS3 frame, i.e. every 125 µs. This means that the data stream is delayed by N×125 µs, where N is the size of a burst. In practice, this delay should not exceed 8 ms in order to avoid echo problems. The maximum size of the write bursts is thus 64 bytes.

In the present case, it is necessary to alternate read cycles and write cycles of same size to have equal input and output transmission rates, whereby the size of the read bursts is also 64 bytes.

Moreover, a DMA burst does not only transfer effective data: bus arbitration information must also be exchanged. As a consequence, a DMA burst for 64 bytes, assuming the local bus is 32 bits wide, needs 30 clock cycles (or 0.8 µs)on the local bus (16 for the effective data and 14 for the bus arbitration).

With these assumptions, one 64 byte read cycle and one 64 byte write cycle take in all 3.8 µs (4×0.3+1+2×0.8), which corresponds to a throughput of 33.7 Mbytes/s. This is then the maximum achievable throughput on the local bus. This throughput is insufficient because it is barely larger than the necessary throughput of 32 Mbytes/s. and leaves too little place for fluctuations and other necessary overhead, such as interrupt handling for switching the PCI bus between master and slave modes.

Figure 11A:
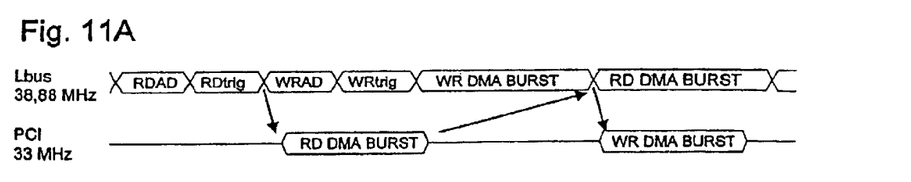
FIGS. 11A and 11B are time diagrams of optimized DMA cycles, respectively in a best case and in a worst case.
Figure 11B:
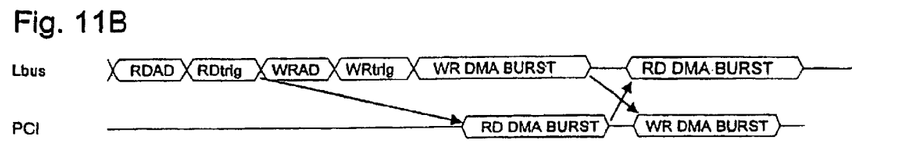

FIGS. 11A and 11B illustrate a DMA access scheme avoiding this problem. A DMA write cycle is setup immediately after the setup of a DMA read cycle, i.e. the PCI bridge instructions for a write cycle (WRAD and WRtrig), are provided on the local bus Lbus immediately after the RDtrig instruction.

In the best case, illustrated in FIG. 11A, the burst of data to be read will be placed on the PCI bus shortly after the RDtrig instruction, while the write setup instructions WRAD and WRtrig are being provided on the local bus. This means the read burst cannot be placed on the local bus immediately, since the local bus is busy. The read burst is stored in a buffer of the PCI bridge awaiting a time when the local bus becomes free. This time could be immediately after the WRtrig instruction. Instead, the burst of data to be written is placed on the local bus immediately after the WRtrig instruction, and the read burst is placed on the local bus immediately after the write burst. In this manner, the same procedure will be usable both in the best case and in the worst case described below. The write burst is also stored in a buffer before it is placed on the PCI bus, since the PCI bus is likely to be busy with the end of the read burst when the write burst begins on the local bus.

As shown, the bursts on the PCI bus are shorter than those on the local bus (they last 0.6 µs instead of 0.8 µs). Indeed, although the PCI bus is clocked at 33 MHz (slower than the local bus), there is less overhead exchanged in each burst on the PCI bus.

In the worst case, as illustrated in FIG. 11B, the read burst arrives on the PCI bus 1 µs after the RDtrig instruction, in the middle of the write DMA burst which was placed on the local bus immediately after the WRtrig instruction. The write burst on the local bus finishes prior to the read burst on the PCI bus, whereby the read burst is transferred onto the local bus and the write burst transferred onto the PCI bus only after the end of the read burst on the PCI bus. As shown, this leaves an idle interval between the write and read bursts on the local bus. This idle interval, substantially 0.2 µs, is shorter than the time separating the beginning of the read burst on the PCI bus from the beginning of the write burst on the local bus, because, as previously mentioned, the PCI bursts are shorter than the local bus bursts.

With this method, the transfer of two 64-byte bursts takes in total 3 µs, which corresponds to a sufficient throughput of 42.7 Mbytes/s.

The 64 bytes of a DMA burst are read (or written) in a single FIFO of buffer 36 (or 38) The FIFOs are polled sequentially, not necessarily in the order they are filled or emptied by the VT processor 16. In practice, the FIFOs have a depth of 256 bytes and, at start-up, they will be given time to fill up half way before they are polled the first time. Since the filling and emptying rates of the FIFOs are normally equal, a FIFO will normally contain the same number of bytes, nominally 128, each time it is polled.

If a virtual tributary is slower than nominal in the OC3 signal, the number of bytes contained in the corresponding FIFOs decreases between two polls. At a given time, the FIFOs will contain insufficient data to poll, i.e. less than 64 bytes at each poll. As a consequence, the host computer receives less bytes in each DMA write burst. But this has no detrimental consequence, since the effectively transferred bytes are appended to a file in the host system, whereby the integrity of the byte stream is preserved.

If a virtual tributary is faster than nominal, the number of bytes contained in the corresponding FIFOs increases between two polls. At a given time, the FIFOs will be full and tend to wrap around, i.e. an incoming byte is written over the first byte of the FIFO before this first byte can be sent out in a DMA burst. This would cause data loss. To avoid this data loss, a small group of FIFOs is polled between two main poll sequences of all the FIFOs, the group of FIFOs being changed each time. For example, the FIFOs are polled according to the following sequences:
1–2016,
1–8,
1–2016,
9–16,
1–2016,
17–24,
etc.

During each main poll sequence, 64 bytes are systematically read out of each FIFO. During an extra poll sequence, 64 bytes are read out of a FIFO only if the FIFO contains more than 128 bytes. With this technique, a FIFO having a higher than nominal fill rate will he emptied an extra time every now and then, depending on the effective fill rate of the FIFO.

The transmit FIFOs 38, i.e. those receiving the DMA read bursts from the PCI bus, need no overflow managing. Indeed, the data coming from the PCI bus are synchronized on the local bus clock (38.88 MHz). They are only there to account for the fact that the data coming from the PCI bus is not necessarily sent out in the same order in an STS3 frame.

The operation of the TDM buffer manager 28 (FIG. 7) will now be described. The TDM buffer manager 28 is in charge of exchanging DS0 bytes between a telecommunications bus, H.100 in the present example, and buffer 30. Like buffer 24 for the PCI bus, buffer 30 comprises receive and transmit buffers 36 and 38 containing, each, 2016 FIFOs respectively associated to individual channels.

Whether a channel is associated to the PCI bus or a telecommunications bus is determined by the user in channel memories 34 and 40 (FIG. 9).

An H.100 bus has 32 wires, each of which conveys 128 "time slots" arranged in 125 μs frames. In other words, the H.100 bus conveys 4096 time slots in 125 μs. Each time slot corresponds to a serial transmission of a respective DS0 byte, whereby one H.100 bus is sufficient for conveying all full duplex OC3 traffic.

Figure 12:
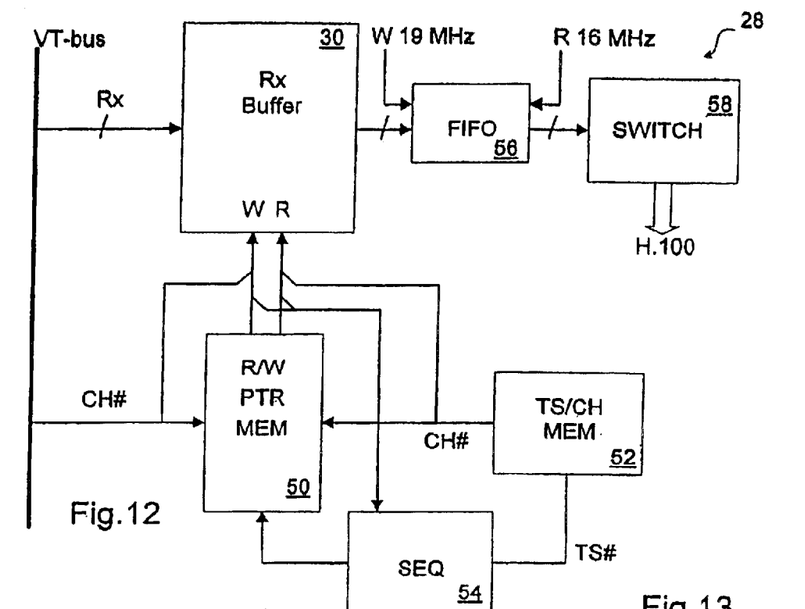
FIG. 12 schematically shows an embodiment of a TDM buffer manager used in the device of FIG. 7.

To exchange data with the H.100 buses, the data is read and written byte by byte in each FIFO by the TDM buffer manager 28, as opposed to by bursts of 64 bytes on the PCI bus side.

A single byte is read in each receive FIFO 36 during a poll sequence. The byte is stored awaiting its time slot on the corresponding H.100 bus, and finally sent out in series on the respective wire.

A difficulty in the use of a telecommunications bus is the real time requirements it has, in particular for placing data on the bus. A time slot is always sent, whether it contains data or not; if the byte for the time slot arrives too late, the time slot will be sent with garbage. If the byte arrives too early, it cannot be sent out either, because the time slot is occupied by the previous byte.

The use of a FIFO allows transmission rate drifts to be compensated, provided that it does not reach an under or overflow condition, i.e. that the average transmission rate is equal to the nominal rate.

If the bytes of a channel are received slower than nominal, the number of bytes contained in the corresponding FIFO will decrease in time. At a given time, the FIFO underflows, i.e. contains no bytes when it is polled. Conventionally, the FIFO would signal that the reading process must stop. However, the transmission process on an H.100 bus cannot be stopped, whereby a garbage byte is sent on the bus.

This condition is reached when the transmission signal has reached a lag of N bytes, where N is the number of bytes initially stored in the FIFO. Number N will be chosen so that the error rate meets a required criterion, for example one error every 10 minutes.

The clocks of the devices connected to a SONET or SDH link are so-called "stratum 3", which means that they have an accuracy of +/−4.6 ppm in free-running mode. The free-running mode is an exceptional mode where a device has lost synchronization. The data flow the device sends, typically VT1.5 containers, will thus skip 4.6 bits every million, which amounts to one error every 27 seconds for the VT1.5 transmission rate of 1.544: Mbits/s. In order to meet the "one error every 10 minutes" criterion, the initial content N of the FIFOs is chosen equal to 32, and the FIFO depth is chosen equal to 64. With the value 32, the error rate is in fact one error every 14 minutes.

If the data corresponds to sound or images, an error from time to time has no perceptible impact. If no errors are tolerated, an error recovery mechanism will be used. For instance, the error is detected by the user circuit through a CRC check performed on a current data packet, and the user circuit requests the current packet to be resent by the transmitter. The data received until the arrival of the resent packet is then discarded.

The use of FIFOs as described above is satisfactory if the transmission signal has a speed drift which varies between too slow and too fast. A problem arises if the transmission signal has a sustained speed error.

In the case of a sustained transmission speed lag, once the FIFO has reached an empty state, say after 14 minutes of operation, a first garbage byte is sent on the H.100 bus. The subsequent times the FIFO is polled, it will contain at most one byte and be empty every 14/32=0.44 minutes (in the present example where the 14 minutes value is reached with initially 32 bytes in the FIFO). As a consequence, the error rate is multiplied by 32 and becomes unacceptable.

In order to overcome this drawback, the TDM buffer manager stops reading the FIFO once it has reached an underflow condition, and this until the FIFO contains again 32 bytes. As a consequence, a burst of 32 consecutive garbage bytes is sent on the H.100 bus. However, this is not more detrimental than sending a single garbage byte, because the user circuit only needs the transmission to restart from the packet containing the first of the 32 garbage bytes, i.e. request a single packet to be resent. In fact, a burst of consecutive errors may under these conditions be considered as a single error.

The error rate is then again one every 14 minutes.

If the bytes of a channel are received too fast, the number of bytes contained in the corresponding FIFO will increase in time. After a given time, the FIFO is full.

Conventionally, a request would then be sent to the transmitter to stop sending data, but this is not possible in the present case, because of the synchronous characteristic of the SONET link. As a consequence any byte received when the FIFO is full is discarded.

The user circuit of the H.100 bus detects the error and requests the data packet to be resent.

The FIFO depth is chosen so that the error rate resulting from a transmission speed lead meets a predetermined specification, one error every 10 minutes in the present example. The chosen depth is 64 in the example, which leaves 32 bytes above the initial content of 32 bytes and yields one error every 14 minutes.

If the transmission speed lead is sustained, the FIFO becomes full after 14 minutes of operation, whereby a first byte is discarded. For the next received bytes, the FIFO will have at most one free location and be full every 0.44 minutes. As a consequence, further bytes are discarded at an unacceptable rate of one every 0.44 minutes.

To overcome this drawback, the TDM buffer manager allows the FIFO to wraparound, i.e. the first unread byte of the FIFO is overwritten with an incoming byte when the FIFO is full. As a consequence, all 64 bytes contained in the FIFO are discarded. Again, this is not more detrimental than discarding a single byte, because the user circuit of the H.100 bus will detect an error and request only once the transmission to restart from the packet in which the error was detected.

To take into account the fact that there is a risk that the transmission speed may drop in the meantime below the nominal speed, the TDM buffer manager allows the FIFO to refill half-way (32 bytes) before sending its contents on the H.100 bus. This causes the sending of 32 garbage bytes on the H.100 bus. But, again, this is not detrimental for the reasons set forth above.

The effective error rate is then again one every 14 minutes.

Sending on the SONET link the data coming on the H.100 bus occurs synchronously with the time slots of the H.100 bus, whereby the transmit FIFOs 38 are simply used for reordering purposes, like the transmit FIFOs on the PCI bus side.

FIG. 12 schematically shows an embodiment of a TDM buffer manager 28 for the incoming byte stream Rx. The receive FIFOs are included in a single port RAM 30 which is alternately read and write accessed with addresses provided by a read/write pointer memory 50, which is a dual-port RAM in this embodiment. Each location of pointer memory 50 contains a write pointer and a read pointer, and is selected by a respective channel number alternately provided by the VT-bus and by a time-slot/channel number memory 52. This memory 52 assigns the channel numbers to respective time slots and is programmable by the user.

Such a solution for implementing a plurality of FIFOs may of course also be used on the PCI bus side. Then, channel memory 52 maps DMA bursts to channel numbers instead of time slots to channel numbers.

When a byte is written in a FIFO from the VT-bus, the pointer memory 50 is responsive to the channel number provided on the VT-bus, FIFO memory 30 is then read selected with an address whose MSBs are the channel number and the LSBs are the write pointer provided by pointer memory 50. This write pointer is then updated by a sequencer 54 an rewritten in its current location in pointer memory 50.

In a next cycle, a byte to be sent in an H.100 time slot is read from a FIFO in memory 30. The time slot is identified by sequencer 54 and provided as a read address to channel number memory 52. Memory 52 thus provides a channel number as a read address to pointer memory 50. This same channel Dumber is appended as the MSBs to the read pointer then provided by pointer memory 50 to constitute the read address of FIFO memory 30. This read pointer is updated by the sequencer and rewritten in its current location of pointer memory 50.

The time slot numbers generated by sequencer 54 are preferably consecutive and such that numbers 0 to 31 correspond to the first time slot of each of the 32 wires, numbers 32 to 63 correspond to the second time slot of each of the 32 wires, and so on.

Although the effective transmission rate of the byte stream Rx is 16 Mbytes/s, the bytes are read and written at 19.44 Mbytes/s in FIFO memory 30, i.e. with the time base used for processing SONET signals. Since FIFO memory 30 is single-ported, the read and write rates are equal. However, the H.100 bus needs the bytes to be provided at their effective rate of 16 Mbytes/s. For this purpose, the bytes are written in a clock adapter FIFO 56 at 19.44 MHz and read there out at 16 MHz.

Finally, the bytes are placed in respective time slots of the H.100 bus by a switch 58. Switch 58 sends out each byte in series on a corresponding one of 32 wires, during the respective time slot.

Switch 58 may comprise 32 pairs of registers respectively associated to the wires. 32 consecutive bytes from FIFO 56 are respectively written in the first registers of the pairs, while the second registers of the pairs are read out bit-by-bit onto the respective wires. The roles of the first and second registers are swapped for a next batch of 32 bytes.

The circuitry for processing the transmit byte stream Tx, i.e. the data coming from the H.100 bus and sent to the SONET link, is strictly symmetric to the circuitry described above and will therefore not be described.

Figure 13:
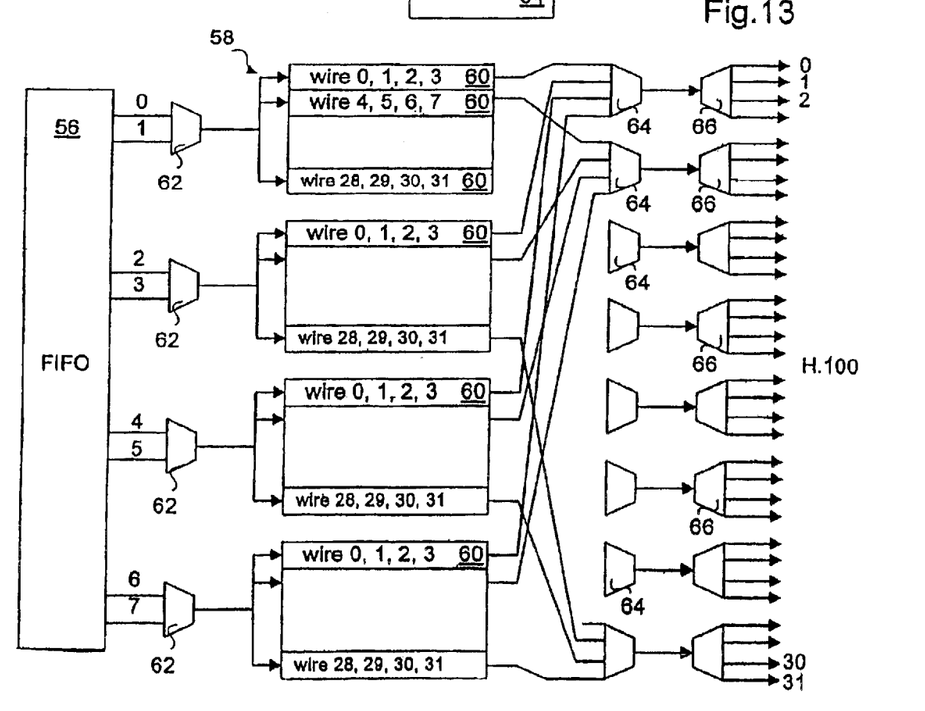
FIG. 13 schematically shows an optimized embodiment of a switch.

FIG. 13 schematically shows an embodiment of a switch 58 particularly well adapted to an FPGA (Fully Programmable Gate Array) implementation. The solution described above for the switch is adapted to a full custom integrated circuit design; if implemented in an FPGA, it would require at least one logic block of the array per flip-flop, i.e. 2×8×32=512 logic blocks, which is a large amount.

The switch of FIG. 13 comprises four groups of eight 1-bit dual-port memories 60. Each memory 60 is 16 bits deep, 8 bits being intended to receive data from FIFO 56, while the other 8 bits are sent on wires of the H.100 bus.

Each dual-port memory 60 has the advantage that it can be realized with only two FPGA logic blocks, whereby a total of 32 logic blocks are used for the storage in the switch.

Each memory 60 of a group is assigned to four consecutive wires. Each group is assigned to two adjacent bits of a byte received from FIFO 56. The inputs of the eight memories 60 of a group are corrected to the output of a 2-1 multiplexer 62 which receives on its two inputs the respective two bits of the current byte from FIFO 56. Eight 4-1 multiplexers 64 are connected so that the $i^{th}$ multiplexer receives on its $j^{th}$ input the output of the $i^{th}$ memory 60 of the $j^{th}$ group, where i varies between 1 and 8 and j varies between 1 and 4.

Eight 1–4 demultiplexers 66 respectively receive the outputs of multiplexers 64, and the four outputs of each correspond to four consecutive wires of the H.100 bus.

Each multiplexer or demultiplexer requires a single FPGA logic block. As a result, the whole switch requires 52 logic blocks (plus a few more for controlling the elements) instead of the 512 required if a conventional switch structure were implemented in an FPGA.

A byte is presented to the switch by FIFO 56 together with a time slot number provided by sequencer 54. In fact, only the 5 LSBs of the time slot number are used, which identify the wire on which the byte will be sent, say wire k. The 3 MSBs of number k select one memory 60 in each group, and the 2 remaining LSBs of number k select in those memories the location corresponding to wire k. The selected location of the first selected memory receives bits 0 and 1 of the current byte in two consecutive 32 MHz clock cycles, through the first multiplexer 62. The selected location of the second selected memory receives bits 2 and 3 through the second multiplexer 62, etc.

The bits of the current byte are written in a first half of the memories 60, while the bits contained in the second half are being placed on the wires. The placement of the bits corresponding to a single H.100 bus clock cycle (8 MHz) occurs in four 32 MHz clock cycles.

In a first cycle, the first location of each memory 60 is selected and multiplexers 64 select their first input, while demultiplexers 66 select their first output. A first bit is thus placed on wires 0, 4, 8 . . . 28.

In a second cycle, the second location of each memory 60 is selected, the multiplexers 64 still select their first input, and demultiplexers 66 select their second output. A first bit is thus placed on wires 1, 5, 9 . . . 29.

In a third cycle, the third location of each memory 60 is selected, the multiplexers 64 still select their first input, and demultiplexers 66 select their third output. A first bit is thus placed on wires 2, 6, 10 . . . 30.

In a fourth cycle, the fourth location of each memory 60 is selected, the multiplexers 64 still select their first input, and demultiplexers 66 select their fourth output. A first bit is thus placed on wires 3, 7, 11 . . . 31.

At this stage, all 32 wires convey a respective bit, corresponding to bit 0 of 32 bytes to convey in respective time slots. And the first group of memories 60 has been emptied.

The four above cycles are repeated once more to place bit 1 of the 32 bytes on the 32 wires.

To consecutively place bits 3 and 4 of the 32 bytes on the wires, the four above cycles are repeated again twice, except that the multiplexers 64 select their second input. And so on, until all the inputs of multiplexers 64 have been selected and memories 60 emptied.

For processing a transmit byte stream Tx, a switch having a structure symmetric to that of FIG. 13 is used. In other words, the inputs and outputs of the memories 60 are reversed, the multiplexers 62 and 64 are replaced by demultiplexers, and the demultiplexers 66 are replaced by multiplexers. Moreover the direct links between the multiplexers 62 and the memories 60 are replaced by 8-1 multiplexers.

The present invention was described in relation with the SONET standard by way of example, but those skilled in the art will readily apply the invention to other similar standards, such as SDH.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A device for individually processing a plurality of data transmission channels, wherein data for each channel is contained at a predetermined position in a serially received frame, including:
   a position calculation unit for determining the position in the frame of currently received data of the frame;
   a channel memory providing a channel number in response to the position of the currently received data; and
   a plurality of FIFOs respectively associated to the channels, wherein each FIFO is responsive to a respective channel number provided by the channel memory for storing the currently received data.

2. The device of claim 1, wherein the FIFOs are respective memory areas in a single-port RAM, further including a pointer memory wherein each location is associated to a respective FIFO in said RAM, contains a write pointer and a read pointer, and is responsive to a channel number to present the read pointer as a read address or the write pointer as a write address to the RAM, the channel number being appended to said read or write address as the most significant bits.

3. The device of claim 1, wherein the frame contains effective data and overhead data and said positions in the frame are consecutive for the effective data.

4. The device of claim 3, wherein the effective data are DS0 bytes contained in virtual tributaries (VTs) or tributary units (TUs) defined according to the SONET or SDH standard.

5. The device of claim 4, wherein the positions are consecutive in a same virtual tributary or tributary unit.

6. The device of claim 4, wherein said frame is an STS3 or STM1 frame defined according to the SONET or SDH standard.

7. The device of claim 1, comprising circuitry for directing said data transmission channels through a PCI bus.

8. The device of claim 1, comprising circuitry for directing said data transmission channels through a telecommunications bus in the form of time slots.

9. The device of claim 1 wherein the channel numbers are settable in the channel memory by a user.

10. A device for individually processing a plurality of data transmission channels, wherein data from each channel is to be inserted at a predetermined position in a serially transmitted frame, including:
    a position generator, providing the position in the frame of currently transmitted data;
    a channel memory providing a channel number in response to the position provided by the position generator; and
    a plurality of FIFOs respectively associated to the channels, wherein each FIFO is responsive to a respective channel number provided by the channel memory for providing data stored therein as the currently transmitted data.

11. The device of claim 10, wherein the FIFOs are respective memory areas in a single-port RAM, further including a pointer memory wherein each location is associated to a respective FIFO in said RAM, contains a write pointer and a read pointer, and is responsive to a channel number to present the read pointer as a read address or the write pointer as a write address to the RAM, the channel number being appended to said read or write address as the most significant bits.

12. The device of claim 10, wherein the frame contains effective data and overhead data and said positions in the frame are consecutive for the effective data.

13. The device of claim 12, wherein the effective data are DS0 bytes contained in virtual tributaries (VTs) or tributary units (TUs) defined according to the SONET or SDH standard.

14. The device of claim 13, wherein the positions are consecutive in a same virtual tributary or tributary unit.

15. The device of claim 13, wherein said frame is an STS3 or STM1 frame defined according to the SONET or SDH standard.

16. The device of claim 10, comprising circuitry for directing said data transmission channels through a PCI bus.

17. The device of claim 10, comprising circuitry for directing said data transmission channels through a telecommunications bus in the form of time slots.

18. The device of claim 10 wherein the channel numbers are settable in the channel memory by a user.

19. A method for individually processing a plurality of data transmission channels, wherein data for each channel is contained at a predetermined position in a serially received frame, including:
- determining the position in the frame of currently received data of the frame;
- providing to a plurality of FIFOs respectively associated with the channels a channel number from a channel memory in response to the position of the currently received data, each FIFO being responsive to a respective channel number provided by the channel memory for storing the currently received data.

20. A device for individually processing a plurality of data transmission channels, wherein data from each channel is to be inserted at a predetermined position in a serially transmitted frame, including:
- generating a position in the frame for currently transmitted data and providing said generated position to a channel memory;
- providing to a plurality of FIFOs respectively associated to the channels a channel number from a channel memory in response to the position provided by the position generator, each FIFO being responsive to a respective channel number provided by the channel memory for providing data stored therein as the currently transmitted data.

21. A device for individually processing a plurality of data transmission channels multiplexed in a full-duplex synchronous data stream, wherein data for each channel is contained at a predetermined position in a serially received or transmitted frame, including:
- a position calculation unit for determining the position in the frame of currently received data of the frame;
- a position generator, providing the position in the frame of currently transmitted data;
- a receive channel memory providing a channel number in response to the position of the currently received data;
- a transmit channel memory providing a channel number in response to the position provided by the position generator; and
- respective pluralities of receive and transmit FIFOs with one transmit and once receive FIFO associated with each channel, wherein each receive FIFO is responsive to a respective channel number provided by the receive channel memory for storing the currently received data and each transmit FIFO is responsive to a respective channel number provided by the transmit channel memory for providing data stored therein as the currently transmitted data.

22. The device of claim 21 including a fiber optic interface for receiving the full-duplex synchronous data stream.

23. The device of claim 21, wherein the data are DS0 bytes contained in virtual tributaries (VTs) or tributary unites (TUs) defined according to the SONET or SDH standard.

24. The device of claim 21 wherein the channel numbers are settable in the channel memory by a user.

25. The device of claim 21 incorporated in an add-in card for use in a general purpose computer.

* * * * *